US006562457B1

(12) United States Patent
Goldfinger et al.

(10) Patent No.: US 6,562,457 B1
(45) Date of Patent: May 13, 2003

(54) POLYETHER ESTER ELASTOMER COMPRISING POLYTRIMETHYLENE ETHER ESTER SOFT SEGMENT AND TETRAMETHYLENE ESTER HARD SEGMENT

(75) Inventors: Marc B. Goldfinger, West Chester, PA (US); Hari B. Sunkara, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 37 days.

(21) Appl. No.: 10/016,195

(22) Filed: Oct. 31, 2001

(51) Int. Cl.$^7$ .......................... D02G 3/00; C08G 63/66
(52) U.S. Cl. ............... 428/365; 528/298; 528/299; 528/300; 528/301; 528/302; 528/307; 528/308; 528/308.6; 428/359; 428/364; 264/176.1
(58) Field of Search ............... 528/298, 299, 528/300, 301, 302, 307, 308, 308.6; 428/359, 364, 365; 264/176.1

(56) References Cited

U.S. PATENT DOCUMENTS

| | | | |
|---|---|---|---|
| 2,865,891 A | 12/1958 | Michel ......................... 260/75 |
| 3,023,192 A | 2/1962 | Shivers, Jr. et al. ........... 260/75 |
| 3,324,413 A | 6/1967 | Bell et al. ..................... 260/75 |
| 3,326,985 A | 6/1967 | Mason ....................... 260/615 |
| 3,384,623 A | 5/1968 | Inoue et al. ................... 260/75 |
| 3,651,014 A | 3/1972 | Witsiepe ....................... 260/75 |
| 3,766,146 A | 10/1973 | Witsiepe ....................... 260/75 |
| 3,775,373 A | 11/1973 | Wolfe, Jr. ..................... 260/75 |
| 3,784,520 A | 1/1974 | Hoeschele .................... 260/75 |
| 4,031,165 A | 6/1977 | Saiki et al. .................. 200/860 |
| 4,251,652 A | 2/1981 | Tanaka et al. |
| 4,277,577 A | 7/1981 | Burg et al. .................. 525/154 |
| 4,405,749 A | 9/1983 | Nelsen ....................... 524/100 |
| 4,482,750 A | 11/1984 | Hetzel et al. ............... 568/621 |
| 4,526,735 A | 7/1985 | Norota et al. ................. 264/27 |
| 4,556,688 A | 12/1985 | McCready et al. ........... 525/33 |
| 4,585,835 A | 4/1986 | Saegusa et al. ............. 525/430 |
| 4,725,481 A | 2/1988 | Ostapchenko ............... 428/213 |
| 4,745,142 A | 5/1988 | Ohwaki et al. ............... 524/87 |
| 4,781,966 A | 11/1988 | Taylor ....................... 428/152 |
| 4,906,729 A | 3/1990 | Greene et al. ............... 528/272 |
| 4,937,314 A | 6/1990 | Greene ....................... 528/272 |
| 4,970,295 A | 11/1990 | Schuchardt ................. 528/416 |
| 5,070,178 A | 12/1991 | Yamada ..................... 528/272 |
| 5,106,678 A | 4/1992 | Abu-Isa ..................... 428/232 |
| 5,128,185 A | 7/1992 | Greene ..................... 428/36.9 |
| 5,153,065 A | 10/1992 | Abu-Isa ..................... 428/364 |
| 5,319,006 A | 6/1994 | Yang et al. ................. 523/500 |
| 5,384,184 A | 1/1995 | Saiki et al. ................. 428/230 |
| 5,403,912 A | 4/1995 | Gunatillake et al. ........ 528/425 |
| 5,430,122 A | 7/1995 | Drysdale ..................... 528/55 |
| 5,436,314 A | 7/1995 | Yang et al. ................. 528/274 |
| 5,565,270 A | 10/1996 | Rehbold et al. ............ 428/364 |
| 5,574,124 A | 11/1996 | Schmalstieg et al. ........ 528/59 |
| 5,659,089 A | 8/1997 | Cai et al. .................. 568/619 |
| 5,696,225 A | 12/1997 | Cai et al. ................... 528/297 |
| 5,840,233 A | 11/1998 | Foss ........................ 264/176.1 |
| 5,853,878 A | 12/1998 | Ishiwata et al. ............ 428/364 |
| 5,858,528 A | 1/1999 | Tashiro et al. ............. 428/357 |
| 5,965,548 A | 10/1999 | Peet et al. .................. 524/290 |
| 5,990,258 A | 11/1999 | Peter .......................... 528/65 |
| 5,993,944 A | 11/1999 | Honna et al. ............... 428/198 |
| 6,017,625 A | 1/2000 | Sato et al. ................... 428/364 |
| 6,046,302 A | 4/2000 | Buning et al. .............. 528/272 |
| 6,235,948 B1 | 5/2001 | Sunkara et al. ............. 568/868 |
| 6,300,463 B1 | 10/2001 | Figuly et al. ............... 528/310 |
| 6,316,586 B1 | 11/2001 | Sunkara et al. |
| 6,331,606 B1 | 12/2001 | Sun |
| 2002/0007043 A1 | 1/2002 | Sunkara et al. |
| 2002/0010374 A1 | 1/2002 | Sunkara et al. |

FOREIGN PATENT DOCUMENTS

| | | |
|---|---|---|
| EP | 0135802 | 11/1988 |
| EP | 431 499 | 10/1994 |
| EP | 1 160 362 | 5/2001 |
| JP | 57-101019 | 6/1982 |
| JP | 04-352878 | 12/1992 |
| JP | 05-140818 | 6/1993 |
| JP | 06-136615 | 5/1994 |
| JP | 06-011543 | 12/1994 |
| JP | 07-090718 | 4/1995 |
| JP | 09-217242 | 8/1997 |
| JP | 2000-038424 | 8/2000 |
| JP | 2000-256919 | 9/2000 |
| JP | 2001-226831 | 8/2001 |
| JP | 2002-030207 A | 1/2002 |
| WO | WO 94/09055 | 4/1994 |
| WO | WO 96/13540 | 5/1996 |
| WO | WO 97/46618 | 12/1997 |
| WO | WO 99/01496 | 1/1999 |
| WO | WO 99/11688 | 3/1999 |
| WO | WO 00/10953 | 3/2000 |
| WO | WO 01/44150 | 6/2001 |
| WO | WO 01/44348 | 6/2001 |

OTHER PUBLICATIONS

Dupont, Hytrel® polyester elastomer, Extrusion Guide (1994).

Dupont, Hytrel® polyester elastomer, Product and Properties Guide (1999).

S. V. Conjeevaram, R. S. Venson & D. J. Lyman, "Block Copolyurethanes Based on Polyoxytrimethylene Glycols", Journal of Polymer Science: Polymer Chemistry Edition, 1985; vol. 23; pp 429–444.

(List continued on next page.)

*Primary Examiner*—Samuel A. Acquah
(74) *Attorney, Agent, or Firm*—Mark D. Kuller

(57) ABSTRACT

A polyether ester elastomer comprising about 90–about 60 weight % polytrimethylene ether ester soft segment and about 10–about 40 weight % tetramethylene ester hard segment, and use thereof in fibers and other shaped articles. The fibers have excellent physical properties, including superior strength and stretch recovery.

38 Claims, No Drawings

OTHER PUBLICATIONS

L. A. Dickinson, "New Elastomers Derived from Copolymers of Tetrahydrofuran and Propylene Oxide", Journal of Polymer Science, 1962; vol. 58; pp 857–868.

Cesar Carlos Gonzalez, Antonio Bello, Jose Manuel Perena, "Oligomerization of Oxetane and Systhesis of Polyterephthalates Derived from 1,3–Propanediol and 3,3'–Oxydipropanol", Makromol. Chem. 190, No. 6; Jun. 1989; pp 1217–1224.

Simon J. McCarthy, Gordon F. Meijs, Pathiraja Gunatillake, "Synthesis, Characterization, and Stability of Poly[(alkylene oxide)ester] Thermoplastic Elastomers" 1997; pp 1319–1332.

F. Fourne, "Elastane yarns: production, properties, application", *Chemiefasern/Textilindustrie* 44/96 E45 (1994) (Translated from *Chemiefasern/Textilindustrie* 44/96, pp 392–398 (1994).

F. Fourne, "Elastan–Garne: Herstellung, Eigrnschaften, Einsatzgebiete", *Chemiefasern/Textilindustrie* 44/96, pp. 392–398 (1994) (Translation listed directly above).

"Copolyesterether elastomer developed by DuPont", High Performance Textiles (P. Lennox–Kerr Editor) (Jun. 1996).

English translation of claims—JP 9–217242.

English translation of claims—JP 7–90718.

POLYETHER ESTER ELASTOMER COMPRISING POLYTRIMETHYLENE ETHER ESTER SOFT SEGMENT AND TETRAMETHYLENE ESTER HARD SEGMENT

FIELD OF THE INVENTION

The present invention relates to polyether ester elastomers, and manufacture and use thereof.

TECHNICAL BACKGROUND

Thermoplastic elastomers (TPEs) are a class of polymers which combine the properties of two other classes of polymers, namely thermoplastics, which may be reformed upon heating, and elastomers which are rubber-like polymers. One form of TPE is a block copolymer, usually containing some blocks whose polymer properties usually resemble those of thermoplastics, and some blocks whose properties usually resemble those of elastomers. Those blocks whose properties resemble thermoplastics are often referred to as "hard" segments, while those blocks whose properties resemble elastomers are often referred to as "soft" segments. It is believed that the hard segments provide similar properties as chemical crosslinks in traditional thermosetting elastomers, while the soft segments provide rubber-like properties.

The weight and mole ratios of hard to soft segments, as well as the type of the segments determines to a great extent the properties of the resulting TPE. For example, longer soft segments usually lead to TPEs having lower initial tensile modulus, while a high percent of hard segments leads to polymers with higher initial tensile modulus. Other properties may be affected as well. Thus, manipulation on the molecular level affects changes in the properties of TPEs, and improved TPEs are constantly being sought.

Frequently the soft segments of TPEs are formed from poly(alkylene oxide) segments. Heretofore the principle polyether polyols have been based on polymers derived from cyclic ethers such as ethylene oxide, 1,2-propylene oxide and tetrahydrofuran. These cyclic ethers are readily available from commercial sources, and when subjected to ring opening polymerization, provide the polyether glycol, e. g., polyethylene ether glycol (PEG), poly(1,2-propylene) glycol (PPG), and polytetramethylene ether glycol (PO4G, also referred to as PTMEG), respectively.

U.S. Pat. No. 3,023,192 Shivers discloses segmented copolyetheresters and elastic polymer yarns made from them. The segmented copolyetheresters are prepared from (a) dicarboxylic acids or ester-forming derivatives, (b) polyethers of the formula HO(RO)$_n$H, and (c) dihydroxy compounds selected from bis-phenols and lower aliphatic glycols. R is a divalent radical, and representative polyethers include polyethylene ether glycol, polypropylene glycol, polytetramethylene glycol, polyhexamethylene glycol, and so on, and n is an integer of a value to provide a polyether with a molecular weight of about 350–6,000.

U.S. Pat. No. 3,651,014 Witsiepe discloses copolyetheresters consisting of recurring long chain and short chain ester units. The long chain ester units are represented by the formula:

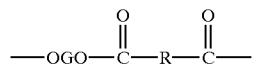

The short chain ester units are represented by the formula:

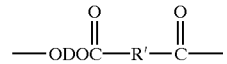

R and R' are divalent radicals remaining after removal of carboxyl groups from a dicarboxylic acid having a molecular weight of less than 300. G is a divalent radical remaining after removal of terminal hydroxyl groups from a long chain polymeric ether glycol, having a molecular weight greater than 600 and a melting point below 55° C. D is a divalent radical remaining after removal of terminal hydroxyl groups from a low molecular weight diol. The copolyesters of this patent are prepared from dicarboxylic acids (or their equivalents), (b) linear long chain glycols and (c) low molecular weight diols; provided however, that there must be used either at least two dicarboxylic acids (or their equivalents) or at least two low molecular weight diols. A list of long chain glycols including "poly(1,2 and 1,3-propylene oxide) glycol" is present at column 4; however, the examples are directed to the use of PO4G as the long chain polymeric ether glycol.

U.S. Pat. No. 4,906,729 Greene et al. discloses segmented thermoplastic copolyetheresters having soft segments formed from a long chain polyalkyleneether glycol containing 80 to 97 mole percent of copolymerized tetrahydrofuran and 3 to 20 mole percent of a copolymerized cyclic alkylene oxide, preferably copolymerized 3-methyltetrahydrofuran, and fibers and films with an improved combination of tenacity, unload power, melting temperatures and set.

U.S. Pat. No. 4,937,314 Greene discloses thermoplastic copolyetherester elastomers comprising at least 70 weight % soft segments derived from poly(alkylene oxide) glycols and terephthalic acid. The hard segments constitute 10–30 weight % of the elastomer and are 95–100% poly(1,3-propylene terephthalate). The specification discloses that the poly(alkylene oxide) glycols have a molecular weight of about 1,500–about 5,000 and a carbon-to-oxygen ratio of 2–4.3. Representative poly(alkylene oxide) glycols include poly(ethylene oxide) glycol, poly(1,2-propylene oxide) glycol, poly(1,3-propylene oxide) glycol, poly (tetramethylene oxide) glycol (PO4G), etc. In the examples, the soft segments are based on PO4G and tetrahydrofuran/ ethylene oxide copolyethers.

U.S. Pat. No. 5,128,185 Greene describes thermoplastic copolyetherester elastomers comprising at least 83 weight % soft segments derived from poly(alkylene oxide) glycols and terephthalic acid. The hard segments constitute 10–17 weight % of the elastomer and comprises poly(1,3-propylenebibenzoate). The specification discloses that the poly(alkylene oxide) glycols having a molecular weight of about 1,500–about 5,000 and a carbon-to-oxygen ratio of 2.5–4.3. Representative examples include poly(ethylene oxide) glycol, poly(1,2-propylene oxide) glycol, poly(1,3-propylene oxide) glycol, poly(tetramethylene oxide) glycol (PO4G), etc. In the examples, the soft segments are based on PO4G and tetrahydrofuran/3-methyl tetrahydrofuran.

All of the aforementioned patents are incorporated herein by reference.

TPEs based on those exemplified in the prior art are primarily based on PO4G, copolymers of tetrahydrofuran and 3-alkyltetrahydrofuran, PEG, PPG and copolymers of these. While a range of polyether ester TPEs can be produced based on these polyethers, there remains the need for an overall improvement in physical properties, including tensile strength, elongation, and stretch-recovery properties, including tensile set and recovery power. The present invention provides distinct advantages toward achieving an overall improved balance of these properties. Particularly unexpected are a large increase in recovery power and a large decrease in stress decay.

SUMMARY OF THE INVENTION

The invention is directed to a polyether ester elastomer comprising about 90–about 60 weight % polytrimethylene ether ester soft segment and about 10–about 40 weight % tetramethylene ester hard segment. They preferably contain at least about 70 weight %, more preferably at least about 74 weight %, polytrimethylene ether ester soft segment, and preferably contain up to about 85, more preferably up to about 82 weight %, polytrimethylene ether ester soft segment. They preferably contain at least about 15 weight %, more preferably at least about 18 weight %, and preferably contain up to about 30 weight %, more preferably up to about 26 weight %, tetramethylene ester hard segment.

The mole ratio of hard segment to soft segment is preferably at least about 2.0, more preferably at least about 2.5, and is preferably up to about 4.5, more preferably up to about 4.0.

The polyether ester preferably has an inherent viscosity of at least about 1.4 dl/g, more preferably at least about 1.6 dl/g, and preferably up to about 2.4 dl/g, more preferably up to about 1.9 dl/g.

The polyether ester is preferably prepared by providing and reacting (a) polytrimethylene ether glycol, (b) 1,4-butanediol and (c) dicarboxylic acid, ester, acid chloride or acid anhydride.

In a preferred embodiment, at least 40 weight % of the polymeric ether glycol used to form the polytrimethylene ether ester soft segment is the polytrimethylene ether glycol, and up to 60 weight % of the polymeric ether glycol used to form the polytrimethylene ether ester soft segment is polymeric ether glycol preferably selected from the group consisting of polyethylene ether glycol, polypropylene ether glycol, polytetramethylene ether glycol, polyhexamethylene ether glycol, and copolymers of tetrahydrofuran and 3-alkyl tetrahydrofuran, and mixtures thereof.

In a preferred embodiment, at least 85 weight % of the polymeric ether glycol used to form the polytrimethylene ether ester soft segment is the polytrimethylene ether glycol.

Preferably, the polytrimethylene ether glycol has number average molecular weight of at least about 1,000, more preferably at least about 1,500. Preferably, the polytrimethylene ether glycol has number average molecular weight of less than about 5,000, more preferably up to about 3,500.

In a preferred embodiment, at least 75 mole % of the diol used to form the tetramethylene ester hard segment is 1,4-butanediol and up to 25 mole % of the diol are diol other than 1,4-butanediol preferably with 2–15 carbon atoms, more preferably selected from ethylene, isobutylene, trimethylene, pentamethylene, 2,2-dimethyltrimethylene, 2-methyltrimethylene, hexamethylene and decamethylene glycols, dihydroxy cyclohexane, cyclohexane dimethanol, hydroquinone bis(2-hydroxyethyl) ether, and mixtures thereof.

Preferred diol other than 1,4-butanediol contain 2–8 carbon atoms. Most preferred are ethylene glycol and 1,3-propanediol, and mixtures thereof.

In a preferred embodiment, at least 85 mole % of the diol used to form the tetramethylene ester hard segment is 1,4-butanediol.

Preferably, the dicarboxylic acid, ester, acid chloride or acid anhydride is an aromatic dicarboxylic acid or ester, more preferably selected from the group consisting of dimethyl terephthalate, bibenzoate, isophthlate, phthalate and naphthalate; terephthalic, bibenzoic, isophthalic, phthalic and naphthalic acid; and mixtures thereof. More preferred are the aromatic diesters.

In a preferred embodiment, at least 50 mole % (more preferably at least 70 mole % and even more preferably at least 85 mole %) of the dicarboxylic acid, ester, acid chloride or acid anhydride is selected from the group consisting of terephthalic acid and dimethyl terephthalate.

In another preferred embodiment, the dicarboxylic acid, ester, acid chloride or acid anhydride are selected from the group consisting of terephthalic acid and dimethyl terephthalate.

In another embodiment, the invention is directed to the polyether ester being prepared by providing and reacting polytrimethylene ether glycol and polytetramethylene ester.

In one embodiment, the invention is directed to a polyether ester comprising a soft segment represented by the structure:

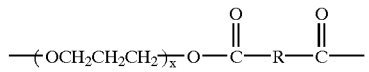

and a hard segment represented by the structure:

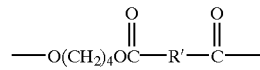

where x is about 17 to about 86 and R and R', which may be the same or different, are divalent radicals remaining after removal of carboxyl functionalities from a dicarboxylic acid equivalent.

The invention is also directed to fibers prepared from the polyether ester.

Preferred fibers include monocomponent filament, staple fiber, multicomponent fiber such as bicomponent fiber (containing the polyether ester as at least one component). The fibers are used to prepare woven, knit and nonwoven fabric.

The invention is further directed to the processes of preparing the polyether ester, fibers and fabrics.

The polyether esters of this invention can be used to prepare melt spinnable thermoplastic elastomers having excellent strength and stretch-recovery properties, not heretofore achieved.

DETAILED DESCRIPTION OF THE INVENTION

The invention is directed to a polyether ester elastomer comprising about 90–about 60 weight % polytrimethylene ether ester soft segment and about 10–about 40 weight % tetramethylene ester hard segment. They preferably contain at least about 70 weight %, more preferably at least about 74 weight %, polytrimethylene ether ester soft segment, and preferably contain up to about 85, more preferably up to about 82 weight %, polytrimethylene ether ester soft segment. They preferably contain at least about 15, more preferably at least about 18 weight %, and preferably contain up to about 30 weight %, more preferably up to about 26 weight %, tetramethylene ester hard segment.

The polyether ester preferably has an inherent viscosity of at least about 1.4 dl/g, more preferably at least about 1.6 dl/g, and preferably up to about 2.4 dl/g, more preferably up to about 1.9 dl/g.

Herein, "polytrimethylene ether ester soft segment" and "soft segment" are used to refer to the reaction product of polymeric ether glycol and dicarboxylic acid equivalent which forms an ester connection, wherein at least 40 weight % of the polymeric ether glycol used to form the soft segment is polytrimethylene ether glycol (PO3G). Preferably at least 45 weight %, more preferably at least 50 weight %, even more preferably at least 85 weight %, and most preferably about 95–100 weight %, of the polymeric ether glycol used to form the soft segment is PO3G.

When referring to the polytrimethylene ether glycol, dicarboxylic acid equivalent, etc., it should be understood that reference is to one or more of these items. Thus, for instance, when referring to at least 40 weight % of the polymeric ether glycol used to form the soft segment being polytrimethylene ether glycol, it should be understood that one or more polytrimethylene ether glycol can be used.

When PO3G is used to form the soft segment, it can be represented as comprising units represented by the following structure:

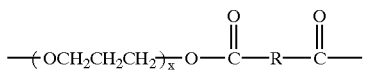

wherein R represents a divalent radical remaining after removal of carboxyl functionalities from a dicarboxylic acid equivalent.

A wide range of molecular weights of the PO3G can be used. Preferably the PO3G has a number average molecular weight (Mn) of at least about 1,000, more preferably at least about 1,500, and most preferably at least about 2,000. The Mn is preferably less than about 5000, more preferably less than about 4,000, and most preferably less than about 3,500. Therefore, x in the above formula is at least about 17, more preferably at least about 25 and most preferably at least about 34, and is less than about 86, more preferably less than about 67 and most preferably less than about 60. PO3G's useful for this invention are described in U.S. patent application Ser. Nos. 09/738,688 and 09/738,689, both filed Dec. 15, 2000 (now U.S. Patent Application Publication Nos. 2002/0007043 A1 and 2002/0010374 A1), and their PCT counterparts WO 01/44348 and 01/44150, all of which are incorporated herein by reference.

PO3G can be prepared by any process known in the art. For example, PO3G can be prepared by dehydration of 1,3-propanediol or by ring opening polymerization of oxetane. The process is irrelevant so long as the polyether glycol meets the specifications for the final polymer product. Methods for making PO3G are described in U.S. patent application Ser. Nos. 09/738,688 and 09/738,689, both filed Dec. 15, 2000 (now U.S. Patent Application Publication Nos. 2002/0007043 A1 and 2002/0010374 A1) and their PCT counterparts WO 01/44348 and 01/44150, all of which are incorporated herein by reference.

Up to 60 weight % of the soft segment may comprise polymeric ether glycol other than PO3G. Preferred are those selected from the group consisting of polyethylene ether glycol (PEG), polypropylene ether glycol (PPG), polytetramethylene ether glycol (PO4G), polyhexamethylene ether glycol, and copolymers of tetrahydrofuran and 3-alkyl tetrahydrofuran (THF/3MeTHF). The other polymeric ether glycols preferably have a number average molecular weight of at least about 1,000, more preferably at least about 1,500, and preferably up to about 5,000, more preferably up to about 3,500. An especially important copolymer is the copolymer of tetrahydrofuran and 3-methyl tetrahydrofuran (THF/3MeTHF). Preferably up to 55 weight %, more preferably up to 50 weight %, and most preferably up to 15 weight %, of the polyethylene ether glycol used to form the soft segment is PO3G.

By "tetramethylene ester hard segment" and "hard segment" reference is to the reaction product of diol(s) and dicarboxylic acid equivalent which forms an ester connection, wherein at least 50 mole %, more preferably at least 75 mole %, even more preferably at least 85 mole % and most preferably 95–100 mole %, of the diol used to form the hard segment is 1,4-butanediol.

When 1,4-butanediol is used to form the hard segment, it can be represented as comprising units having the following structure:

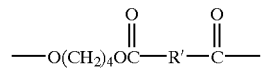

R' represents a divalent radical remaining after removal of carboxyl functionalities from a dicarboxylic acid equivalent. In most cases, the dicarboxylic acid equivalents used to prepare the soft segment and the hard segment of the polyether ester of this invention will be the same.

The hard segment can also be prepared with up to 50 mole % (preferably up to 25 mole %, more preferably up to 15 mole %), of diols other than butylene diol. They preferably have a molecular weight lower than 400 g/mol. The other diols are preferably aliphatic diols and can be acyclic or cyclic. Preferred are diols with 2–15 carbon atoms such as ethylene, isobutylene, trimethylene, pentamethylene, 2,2-dimethyltrimethylene, 2-methyltrimethylene, hexamethylene and decamethylene glycols, dihydroxy cyclohexane, cyclohexane dimethanol, hydroquinone bis(2-hydroxyethyl) ether. Especially preferred are aliphatic diols containing 2–8 carbon atoms. Most preferred are diols selected from the group consisting of ethylene glycol and 1,3-propanediol. Two or more other diols can be used.

By "dicarboxylic acid equivalent" is meant dicarboxylic acids and their equivalents from the standpoint of making the compounds of this invention, as well as mixtures thereof. The equivalents are compounds which perform substantially like dicarboxylic acids in reaction with glycols and diols.

The dicarboxylic acid equivalents can be aromatic, aliphatic or cycloaliphatic. In this regard, "aromatic dicarboxylic acid equivalents" are dicarboxylic acid equivalents in which each carboxyl group is attached to a carbon atom in a benzene ring system such as those mentioned below. "Aliphatic dicarboxylic acid equivalents" are dicarboxylic acid equivalents in which each carboxyl group is attached to a fully saturated carbon atom or to a carbon atom which is part of an olefinic double bond. If the carbon atom is in a ring, the equivalent is "cycloaliphatic."

The dicarboxylic acid equivalent can contain any substituent groups or combinations thereof, so long as the substituent groups do not interfere with the polymerization reaction or adversely affect the properties of the polyether ester product. Dicarboxylic acid equivalents include dicarboxylic acids, diesters of dicarboxylic acids, and diester-forming derivatives such as acid halides (e.g., acid chlorides) and anhydrides.

Especially preferred are the dicarboxylic acid equivalents selected from the group consisting of dicarboxylic acids and diesters of dicarboxylic acids. More preferred are dimethyl esters of dicarboxylic acids.

Preferred are the aromatic dicarboxylic acids or diesters by themselves, or with small amounts of aliphatic or cycloaliphatic dicarboxylic acids or diesters. Most preferred are the dimethyl esters of aromatic dicarboxylic acids.

Representative aromatic dicarboxylic acids useful in the present invention include terephthalic acid, isophthalic acid, bibenzoic acid, naphthalic acid, substituted dicarboxylic compounds with benzene nuclei such as bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, etc., and $C_1$–$C_{10}$ alkyl and other ring substitution derivatives such as halo, alkoxy or aryl derivatives. Hydroxy acids such as p-(hydroxyethoxy)benzoic acid can also be used providing an aromatic dicarboxylic acid is also present. Representative aliphatic and cycloaliphatic dicarboxylic acids useful in this invention are sebacic acid, 1,3-or 1,4-cyclohexane dicarboxylic acid, adipic acid, dodecanedioic acid, glutaric acid, succinic acid, oxalic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethyl succinic acid, cyclopentanenedicarboxylic acid, decahydro-1,5- (or 2,6-)naphthalene dicarboxylic acid, 4,4'-bicyclohexyl dicarboxylic acid, 4,4'methylenebis (cyclohexylcarboxylic acid), 3,4-furan dicarboxylate, and 1,1-cyclobutane dicarboxylate. The dicarboxylic acid equivalents in the form of diesters, acid halides and anhydrides of the aforementioned aliphatic dicarboxylic acids are also useful to provide the polyether ester of the present invention. Representative aromatic diesters include dimethyl terephthalate, bibenzoate, isophthlate, phthalate and naphthalate.

Of the above, preferred are terephthalic, bibenzoic, isophthalic and naphthalic acid; dimethyl terephthalate, bibenzoate, isophthlate, naphthalate and phthalate; and mixtures thereof. Particularly preferred dicarboxylic acid equivalents are the equivalents of phenylene dicarboxylic acids especially those selected from the group consisting of terephthalic and isophthalic acid and their diesters, especially the dimethyl esters, dimethyl terephthalate and dimethyl isophthalate. In addition, two or more dicarboxylic acids equivalents can be used. For instance, terephthalic acid or dimethyl terephthalate can be used with small amounts of the other dicarboxylic acid equivalents. In one example, a mixture of diesters of terephthalic acid and isophthalic acid was used.

In a preferred embodiment, at least 50 mole % (more preferably at least 70 mole %, even more preferably at least 85 mole % and most preferably about 95–100 mole %) of the dicarboxylic acid, ester, acid chloride or acid anhydride is selected from the group consisting of terephthalic acid and dimethyl terephthalate.

The polyether ester is preferably prepared by providing and reacting (a) polytrimethylene ether glycol, (b) 1,4-butanediol and (c) dicarboxylic acid, ester, acid chloride or acid anhydride. The other glycols, diols, etc., as described above are can also be provided and reacted.

The polyether ester of this invention is conveniently made starting with a conventional ester exchange reaction, esterification or transesterification depending on the starting dicarboxylic acid equivalent. For example, dimethyl terephthalate is heated with polytrimethylene ether glycol and an excess of 1,4-butanediol in the presence of a catalyst at 150–250° C., while distilling off the methanol formed by the ester exchange. This reaction is typically performed at a pressure of about 1 atmosphere. The reaction product is a mixture of the ester exchange reaction products of the dimethyl terephthalate and the polytrimethylene ether glycol and 1,4-butanediol, primarily bis(hydroxybutyl) terephthalate with varying amounts of (hydroxy-polytrimethylene ether) terephthalates with a small amount of the corresponding oligomers. This mixture then undergoes polymerization or polycondensation to a copolymer of an elastomeric polyether ester with a polytrimethylene ether glycol soft segment and a tetramethylene terephthalate hard segment (condensation product of 1,4-butanediol and dimethyl terephthalate). The polymerization (polycondensation) involves additional ester exchange and distillation to remove the diol to increase molecular weight. The polycondensation is typically performed under vacuum. Pressure is typically in the range of 0.01 to 18 mm Hg (1.3 to 2400 Pa), preferably in the range of 0.05 to 4 mm Hg (6.7 to 553 Pa) and most preferably 0.05 to 2 mm Hg. The polycondensation is typically run at a temperature in the range of about 220° C. to 260° C.

The ester exchange and polymerization steps may involve alternative processes than those described above. For example, polytrimethylene ether glycol can be reacted with polytetramethylene ester (e.g., polytetramethylene terephthalate) in the presence of catalyst (such as those described for the ester exchange, preferably the titanium catalysts such as tetrabutyl titanate) until randomization occurs. Both processes result in block copolymers.

To avoid excessive residence time at high temperatures and possible accompanying thermal degradation, a catalyst can be employed in the ester exchange. Catalysts useful in the ester exchange process include organic and inorganic compounds of titanium, lanthanum, tin, antimony, zirconium, and zinc. Titanium catalysts, such as tetraisopropyl titanate and tetrabutyl titanate, are preferred and are added in an amount of at least about 25 ppm (preferably at least about 50 ppm and more preferably at least about 70 ppm) and up to about 1,000 ppm (preferably up to about 700 ppm and more preferably up to about 400 ppm) titanium by weight, based on the weight of the finished polymer. Tetraisopropyl titanate and tetrabutyl titanate are also effective as polycondensation catalysts. Additional catalyst may be added after ester exchange or direct esterification reaction and prior to polymerization. Preferably the catalyst is tetrabutyl titanate (TBT).

Ester exchange polymerizations are generally conducted in the melt without added solvent, but inert solvents can be added to facilitate removal of volatile components, such as water and diols at low temperatures. This technique is useful during reaction of the polytrimethylene ether glycol or the diol with the dicarboxylic acid equivalent, especially when it involves direct esterification, i. e., the dicarboxylic acid equivalent is a diacid. Other special polymerization techniques can be useful for preparation of specific polymers. Polymerization (polycondensation) can also be accomplished in the solid phase by heating divided solid product from the reaction of polytrimethylene ether glycol, a dicarboxylic acid equivalent, and 1,4-butanediol in a vacuum or in a stream of inert gas to remove liberated diol. This type of polycondensation is referred to herein as "solid phase polymerization" (or abbreviated "SPP").

Batch or continuous methods can be used for the processes described above or for any stage of polyether ester preparation. Continuous polymerization, by ester exchange, is preferred.

In preparing the polyether ester elastomers of this invention, it is sometimes desirable to incorporate known branching agents to increase melt strength. In such instances, a branching agent is typically used in a concentration of 0.00015 to 0.005 equivalents per 100 grams of polymer. The branching agent can be a polyol having 3–6 hydroxyl groups, a polycarboxylic acid having 3 or 4 carboxyl groups, or a hydroxy acid having a total of 3–6 hydroxyl and carboxyl groups. Representative polyol branching agents include glycerol, sorbitol, pentaerytritol, 1,1,4,4-tetrakis(hydroxymethyl)cyclohexane, trimethylol propane, and 1,2,6-hexane triol. Suitable polycarboxylic acid branching agents include hemimellitic, trimellitic, trimesic pyromellitic, 1,1,2,2-ethanetetracarboxylic, 1,1,2-ethanetricarboxylic, 1,3,5-pentanetricarboxylic, 1,2,3,4-cyclopentanetetracarboxylic and like acids. Although the acids can be used as is, it is preferred to use them in the form of their lower alkyl esters.

Properties of the polyether ester will be influenced by varying the composition (dicarboxylic acid equivalent, 1,4-butanediol, polytrimethylene ether glycol, other diol, other glycol, etc.), the weight percent of hard segment, and the mole ratio of hard segment to soft segment.

The preferred mole ratio of hard segment repeat units per soft segment (HS/SS) will depend on the composition of the hard segment repeat units, the weight percent hard segment, and the molecular weight of the polyether glycol. The mole ratio of hard segment to soft segment is preferably at least about 2.0, more preferably at least about 2.5, and is preferably up to about 4.5, more preferably up to about 4.0. When the ratio is below the minimum value of the range, the polymer may possess an undesirably low tenacity and low melting temperature. At ratios higher than 5, difficulties may be encountered in melt processing the polymer. The best balance of processability and properties are obtained with copolymers having a mole ratio of hard segment to soft segment of 2.5–4.0.

The polyether esters of this invention are useful in making fibers, films and other shaped articles.

The fibers include monocomponent and multicomponent fiber such as bicomponent fiber (containing the polyether ester as at least one component), and can be continuous filaments or staple fiber. The fibers are used to prepare woven, knit and nonwoven fabric. The nonwoven fabrics can be prepared using conventional techniques such as use for meltblown, spunbonded and card and bond fabrics, including heat bonding (hot air and point bonding), air entanglement, etc.

The fibers are preferably at least about 10 denier (11 dtex), and preferably are up to about 2,000 denier (2,200 dtex), more preferably up to about 1,200 denier (1,320 dtex), and most preferably up to about 120 denier (132 dtex).

Spinning speeds can be at least about 200 meters/minute (m/min), more preferably at least about 400 m/min, and ever more preferably at least about 500 m/min, and can be up to about 1,200 m/min or higher.

The fibers can be drawn from about 1.5× to about 6×, preferably at least about 1.5× and preferably up to about 4×. Single step draw is the preferred drawing technique. In most cases it is preferred not to draw the fibers.

The fibers can be heat set, and preferably the temperature is at least about 140° C. and preferably up to about 160° C.

Finishes can be applied for spinning or subsequent processing, and include silicon oil, mineral oil, and other spin finishes used for polyesters and polyether ester elastomers, etc.

The fibers are stretchy, have good chlorine resistance, can be dyed under normal polyester dyeing conditions, and have excellent physical properties, including superior strength and stretch recovery properties, particularly improved unload power and stress decay.

Conventional additives can be incorporated into the polyether ester or fiber by known techniques. The additives include delusterants (e.g., $TiO_2$, zinc sulfide or zinc oxide), colorants (e.g., dyes), stabilizers (e.g., antioxidants, ultraviolet light stabilizers, heat stabilizers, etc.), fillers, flame retardants, pigments, antimicrobial agents, antistatic agents, optical brightners, extenders, processing aids, viscosity boosters, and other functional additives.

EXAMPLES

The following examples are presented to illustrate the invention and are not intended be limiting. Therein, all percentages, parts, etc., are by weight unless otherwise indicated.

Hard Segment Weight Percentage Calculation

The weight percent hard segment was calculated according to the following formula:

$$\frac{100 \, (M_{hs}) \, [(w_1/M_1) - (w_2/M_2)]}{(M_{hs}) \, [(w_1/M_1) - (w_2/M_2)] + (M_{ss})(w_2/M_2)}$$

where:

$w_1$ is weight of the dicarboxylic acid equivalent $w_2$ is weight of the glycol $M_1$ is molecular weight of the dicarboxylic acid equivalent in amu $M_2$ is molecular weight of the glycol in atomic mass units ("amu") (grams/mole)

$M_{hs}$ is molecular weight of the hard segment repeat unit in amu (grams/mole)

$M_{ss}$ is molecular weight of the soft segment in amu (grams/mole)

Number Average Molecular Weight (Mn)

The number average molecular weights (Mn) of polytrimethylene ether glycols were determined either by analyzing hydroxyl end-groups using NMR spectroscopic method or by titration. Hydroxyl number was determined according to ASTM E222 method and is the way that should be used to analyze whether something is within the scope of this invention.

Inherent Viscosity

Inherent Viscosity (IV) measurements were made following ASTM Method 2857-70. The polymer samples were dried at 70° C. for 3 hours before weighing. Samples were run at 30° C. using a 0.5% solution in m-cresol. To improve efficiency, accuracy, and precision an AutoVisc® Automatic Measuring System (Design Scientific, Gainesville, Ga., U.S.A., now believed to be manufactured by Cannon Instruments, State College, Pa., U.S.A. under the name AutoVisc® I) automated viscosity measuring system was used. A high density infrared fiber optic detection system was used in place of a human operator and an air bath was used in place of the oil or water bath normally used to provide constant temperature. The AutoVisc exceeds the accuracy specifications of ASTM D-445, "Standard Test Method For Kinematic Viscosity of Transparent and Opaque Liquids".

Fiber Spinning Procedure 1

To perform the melt spinning, a cylindrical cell of 2.2 cm (⅞ inch) inside diameter and 12.7 cm (5 inch) length was employed. The cell was equipped with a hydraulically driven ram that was inserted on top of the sample. The ram had a replaceable Teflon® tip designed to fit snugly inside the cell. An annular electric heater which surrounded the lower quarter of the cell was used for controlling cell temperature. A thermocouple inside the cell heater recorded the cell temperature. Attached to the bottom of the cell was a spinneret, the interior of which included a cylindrical passage, measuring 1.27 cm (0.5 inch) in diameter and 0.64 cm (0.25 inch) in length, which was connected to the bottom of the cell cavity. The spinneret cavity contained stainless steel filters of the following mesh, inserted in the following order, starting from the bottom (i.e., closest to the exit): 50, 50, 325, 50, 200, 50, 100, 50. A compressible annular aluminum seal was fitted to the top of the "stack" of filters. Below the filters was a cylindrical passage of about 2.5 cm (1 inch) length and 0.16 cm (1/16 inch) interior diameter, the lower of which was tapered (at an angle of 60 degrees from the vertical) to meet with an outlet orifice measuring 0.069 cm (0.027 inch) in length and 0.023 cm (0.009 inch) in inside diameter. The spinneret temperature was controlled by a separate annular heater. The exiting filament was wrapped around a set of feed rolls operated at 40 meters/minute, followed by a set of draw rolls operated at 160 meters/minute (4× draw ratio), and then delivered to the final package. The ratio of the speed of the draw roll to the feed roll defines the draw ratio. Physical properties reported herein are for fibers spun at a draw ratio of 4.

Fiber Spinning Procedure 2

The procedures of Fiber Testing Procedure 1 were run, except that the draw rolls operated at 80 meters/minute (draw ratio 2×).

Fiber Tenacity and Elongation

Tenacity at break, T, in grams per denier (gpd) and percent elongation at break, E, were measured on an Instron® Tester equipped with a Series 2712 (002) Pneumatic Action Grips equipped with acrylic contact faces. The test was repeated three times and then the average of the results is reported.

The average denier for the fibers used in the tenacity and elongation measurements is reported as Den 1.

Fiber Unload Power, Stress Decay and Percent Set

The average denier for the fibers used in measuring unload power, stress decay and percent set is reported as Den 2.

Unload power was measured in dN/tex$_{eff}$×1000. One filament, a 2-inch (5 cm) gauge length, was used for each determination. Separate measurements were made using zero-to-300% elongation cycles. Unload power (i.e., the stress at a particular elongation) was measured after the samples have been cycled five times at a constant elongation rate of 1000% per minute and then held at 300% extension for half a minute after the fifth extension. While unloading from this last extension, the stress, or unload power, was measured at various elongations. Unload powers are reported herein as the effective unload power using the general form "UP x/y" where x is the percent elongation to which the fiber was cycled five times and y is the percent elongation at which the stress, or unload power, was measured.

Stress Decay was measured as the percent loss of stress on a fiber over a 30 second period with the sample held at 300% extension at the end of the fifth load cycle.

$$S=((F-C)*100)/F$$

where:

S=Stress Decay, %
F=Stress at full extension
C=Stress after 30 seconds

The percent set was measured from the stress/strain curve recorded on chart paper.

Abbreviations

For convenience, several abbreviations are employed herein:

| | |
|---|---|
| 4GT | Polytetramethylene terephthalate |
| 4GT hard segment | Tetramethylene terephthalate hard segment formed from 1,4-butanediol and dimethyl terephthalate (DMT) |
| PO4G | Polytetramethylene ether glycol |
| PO4G soft segment | Polytetramethylene ether glycol soft segment formed from polytetramethylene ether glycol and DMT |
| THF/3MeTHF | Copolymer of tetrahydrofuran and 3-methyl tetrahydrofuran |
| THF/3MeTHF soft segment | Soft segment from THF/3MeTHF |
| PO3G | Polytrimethylene ether glycol |
| PO3G soft segment | Soft segment from polytrimethylene ether glycol and DMT |
| PO3G/4GT Elastomer | An elastomer comprising PO3G soft segment and 4GT hard segment |
| PO4G/4GT Elastomer | An elastomer comprising PO4G soft segment and 4GT hard segment |
| THF/3MeTHF/4GT elastomer | An elastomer comprising THF/3MeTHF soft segment and 4GT hard segment |

PO3G Preparation

PO3G having a number average molecular weight of 2360 was prepared using the procedures described in Example 4 of pending U.S. patent application, Ser. No. 09/738,688, filed Dec. 15, 2000 (now U.S. Patent Application Publication No. 2002/0007043 A1, corresponding to WO 01/44348).

PO3G having a number average molecular weight of 1590 was prepared following the procedure described above except the polymerization was carried out for 11.5 hours at 170° C. and the hydrolysis was carried out at 100° C. for 6 hours.

PO3G having a number average molecular weight of 3080 was prepared following the procedure described above in a 2 L reactor vessel. The polymerization was carried out for 36 hours at 160–170° C. and the hydrolysis of the polymer was conducted at 100° C. for 6 hours.

PO3G having a number average molecular weight of 2800 was prepared following the procedure described above in a 22 L reactor vessel. The polymerization was carried out for 29 hours at 160–170° C. and the hydrolysis of the polymer was conducted at 100° C. for 6 hours.

Elastomer Preparation

To prepare the elastomers a two-piece resin kettle was used. The 80 mm diameter, 500 mL capacity kettle bottom was connected to a three-neck kettle top with an o-ring and clamp. One joint was fit with a take-off arm leading to a cold trap to condense volatile reaction by-products. The cold trap in turn was connected to a manifold capable of delivering an inert gas such as argon or nitrogen or providing a vacuum. The reaction was stirred using a mechanical agitator fitted with a stainless-steel paddle stirrer and was interfaced with a Cole-Parmer Servodyne® Controller 4445-30 torquemeter. The torquemeter allowed each run to be reproducibly terminated at a predefined torque reading.

Example 1

A resin kettle was charged with 50.0 g (21.3 mmol) of PO3G polyether glycol having a number average molecular weight of 2360, 18.1 g (201 mmol) of 1,4-butanediol, 18.0 g (92.7 mmol) dimethyl terephthalate, and 0.30 g Ethanox® 330 antioxidant. The flask was evacuated and backfilled with N2 gas three times to create an inert atmosphere. Under a positive $N_2$ gas flow 1.0 mL of catalyst solution was added. The catalyst was Tyzor® TBT Tetrabutyl Titanate (available from E. I. du Pont de Nemours and Company, Wilmington, Del.) and was used as a 5% solution in 1,4-butanediol. The reaction was heated by immersion in a Tin/Bismuth metal bath. The polymerization was allowed to proceed for 45 minutes at 240° C. under $N_2$. At that point vacuum was introduced, and the pressure was lowered from atmospheric to 0.05–0.10 mm Hg (6.7 to 13.3 Pa) over 90 min. The reaction was continued under vacuum at 240° C. until sufficient viscosity was achieved. The flask was backfilled with $N_2$ and the polymer was removed while still hot. Isolated yields typically ranged from 70–90%. Fibers were prepared according to Fiber Spinning Procedure 1. Properties are provided in Table 1.

Comparative Example A

Example 1 was repeated however, PO4G, polytetramethylene ether glycol, molecular weight of 2000, was used in place of the PO3G. Properties are provided in Table 1.

Comparative Example B

Example 1 was repeated however, a copolymer of tetrahydrofuran, THF and 3-methyltetrahydrofuran, 3MeTHF (92% THF/8% 3MeTHF), with molecular weight of 2117, was used in place of the PO3G. Properties are provided in Table 1.

Example 2

Example 1 was repeated using a Spinning procedure 2 (2× draw ratio instead of 4× draw ratio). Properties are provided in Table 1.

Comparative Example C

Example 2 was repeated however, PO4G, polytetramethylene ether glycol, molecular weight of 2000, was used in place of the PO3G. Properties are provided in Table 1.

Comparative Example D

Example 2 was repeated however, a copolymer of tetrahydrofuran, THF and 3-methyltetrahydrofuran, 3MeTHF (92% THF/8% 3MeTHF), with molecular weight of 2117, was used in place of the PO3G. Properties are provided in Table 1.

TABLE 1

| Ex. | SS | HS | % HS | HS/SS Mole Ratio | IV | Draw Ratio | Den 1 | Tenacity (g/d) | Elongation (%) | Den 2 | Unload Power | Stress Decay (%) | Set (%) |
|---|---|---|---|---|---|---|---|---|---|---|---|---|---|
| 1 | PO3G | 4GT | 23.0 | 3.36 | 1.68 | 4X | 81 | 0.77 | 439 | 77 | 121 | 12.33 | 43 |
| A | PO4G | 4GT | 22.6 | 2.88 | 1.63 | 4X | 79 | 0.77 | 374 | 78 | 42 | 31.69 | 89 |
| B | THF/3Me-THF | 4GT | 24.0 | 3.22 | 1.79 | 4X | 87 | 0.83 | 426 | 73 | 96 | 25.43 | 45 |
| 2 | PO3G | 4GT | 23.0 | 3.36 | 1.68 | 2X | 70 | 0.56 | 623 | 74 | 74 | 10.87 | 58 |
| C | PO4G | 4GT | 22.6 | 2.88 | 1.63 | 2X | 73 | 0.53 | 572 | 77 | 40 | 23.82 | 62 |
| D | THF/3Me-THF | 4GT | 24.0 | 3.22 | 1.79 | 2X | 78 | 0.58 | 536 | 80 | 71 | 18.97 | 54 |

As can be seen from Table 1, the polyether ester elastomers derived from soft segments of polytrimethylene ether glycol provide improved properties in terms of toughness (tenacity and elongation) and stretch-recovery (unload power, % set and stress decay) in comparison with polyether esters known in the art, particularly higher unload power and less stress decay.

The higher unload power shows that less material is necessary to achieve a desired retractive force. The lower stress decay shows that elastic garments made with the fibers of the invention will retain their elasticity over repeated or extended use.

Examples 3–7

Example 1 was repeated using polytrimethylene ether glycol of having different Mn's and by varying the amounts of the reactants. Properties are provided in Table 2.

Example 8–12

Examples 3–7 were repeated using a Spinning Procedure 2 (2× draw ratio instead of 4× draw ratio). Properties are provided in Table 2.

TABLE 2

| Ex. | % HS | HS/SS Mole Ratio | PO3G Mn | IV | Draw Ratio | Den 1 | Tenacity (grams/denier) | Elongation (%) | Den 2 | Unload Power | Stress Decay (%) | Set (%) |
|---|---|---|---|---|---|---|---|---|---|---|---|---|
| 3 | 25 | 2.6 | 1590 | 1.60 | 4X | 68 | 0.69 | 367 | 70 | 142 | 14.0 | 50 |
| 4 | 21 | 2.99 | 2360 | 1.68 | 4X | 80 | 0.76 | 435 | 70 | 129 | 13.2 | 36 |
| 5 | 19 | 3.12 | 2800 | 1.53 | 4X | 71 | 0.58 | 457 | 63 | 104 | 13.6 | 38 |
| 6 | 19.5 | 3.53 | 3080 | 1.64 | 4X | 80 | 0.75 | 460 | 84 | 114 | 11.6 | 33 |
| 7 | 17 | 2.99 | 3080 | 1.66 | 4X | 76 | 0.63 | 498 | 83 | 96 | 11.4 | 31 |
| 8 | 25 | 2.6 | 1590 | 1.60 | 2X | 64 | 0.52 | 551 | 69 | 91 | 12.0 | 66 |
| 9 | 21 | 2.99 | 2360 | 1.68 | 2X | 63 | 0.58 | 590 | 70 | 85 | 12.5 | 49 |
| 10 | 19 | 3.12 | 2800 | 1.53 | 2X | 67 | 0.37 | 658 | 67 | 71 | 12.6 | 49 |
| 11 | 19.5 | 3.53 | 3080 | 1.64 | 2X | 69 | 0.52 | 638 | 73 | 77 | 11.8 | 45 |
| 12 | 17 | 2.99 | 3080 | 1.66 | 2X | 56 | 0.51 | 594 | 70 | 67 | 11.9 | 41 |

This data shows that the invention works well with a broad range of polytrimethylene ether glycols and with elastomers having various HS/SS mole ratios.

Example 13

Example 1 was repeated using dimethyl isophthalate in place of 15 mole % of the dimethyl terephthalate and by varying the amount of the reactants. Properties are provided in table 3.

Example 14

Example 5 was repeated using a Spinning procedure 2 (2× draw ratio instead of 4× draw ratio). Properties are provided in Table 3.

TABLE 3

| Ex. | % HS | HS/SS Mole Ratio | IV | Den 1 | Tenacity (grams/Denier) | Elongation (%) | Den 2 | Unload Power | Stress Decay (%) | Set (%) |
|---|---|---|---|---|---|---|---|---|---|---|
| 13 | 23 | 3.36 | 1.55 | 53 | 0.70 | 430 | 59 | 109 | 14.4 | 34 |
| 14 | 23 | 3.36 | 1.55 | 53 | 0.51 | 611 | 55 | 75 | 13.6 | 46 |

Example 15

Example 1 was repeated using a blend of polymers in place of the PO3G. The blend contained PO3G (Mn=2360), PO4G (Mn=2041) and PO4G (Mn=2918) in a ratio of 30/17/13. Properties are provided in Table 5.

Example 16

Example 5 was repeated using a Spinning procedure 2 (2× draw ratio instead of 4× draw ratio). Properties are provided in Table 5.

As can be seen from Table 5, and comparing to data in Table 1, the blend of PO3G with PO4G possesses intermediate properties between PO3G and PO4G.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A polyether ester elastomer comprising about 90–about 60 weight % polytrimethylene ether ester soft segment and about 10–about 40 weight % tetramethylene ester hard segment.

2. A polyether ester as claimed in claim 1 about 85–about 70 weight % polytrimethylene ether ester soft segment and about 15–about 30 weight % tetramethylene ester hard segment.

3. A polyether ester as claimed in claim 1 about 82–about 74 weight % polytrimethylene ether ester soft segment and about 18–about 26 weight % tetramethylene ester hard segment.

TABLE 5

30/17/13 PO3G (Mn = 2360)/PO4G (Mn = 2041)/PO4G (Mn = 2918)

| Ex. | % HS | HS/SS Mole Ratio | IV | Den 1 | Tenacity (grams/Denier) | Elongation (%) | Den 2 | Unload Power | Stress Decay (%) | Set (%) |
|---|---|---|---|---|---|---|---|---|---|---|
| 15 | 21.0 | 3.59 | 1.58 | 73 | 0.59 | 444 | 72 | 97 | 19.0 | 39 |
| 16 | 21.0 | 3.59 | 1.58 | 68 | 0.41 | 624 | 64 | 81 | 15.5 | 47 |

4. A polyether ester as claimed in claim 1 wherein the mole ratio of hard segment to soft segment is in the range of about 2.0–about 4.5.

5. A polyether ester as claimed in claim 1 wherein the mole ratio of hard segment to soft segment is in the range of about 2.5–about 4.0.

6. A polyether ester as claimed in claim 1 having an inherent viscosity of about 1.4–about 2.4 dl/g.

7. A polyether ester as claimed in claim 1 prepared by providing and reacting (a) polytrimethylene ether glycol, (b) 1,4-butanediol and (c) dicarboxylic acid, ester, acid chloride or acid anhydride.

8. A polyether ester as claimed in claim 7 wherein the polytrimethylene ether ester soft segment is prepared from polymeric ether glycol and the dicarboxylic acid, ester, acid chloride or acid anhydride, at least 50 weight % of the polymeric ether glycol used to form the polytrimethylene ether ester soft segment is the polytrimethylene ether glycol.

9. A polyether ester as claimed in claim 7 wherein the polytrimethylene ether ester soft segment is prepared from polymeric ether glycol and the dicarboxylic acid, ester, acid chloride or acid anhydride, at least 40 weight % of the polymeric ether glycol used to form the polytrimethylene ether ester soft segment is the polytrimethylene ether glycol, and up to 60 weight % of the polymeric ether glycol used to form the polytrimethylene ether ester soft segment is polymeric ether glycol selected from the group consisting of polyethylene ether glycol, polypropylene ether glycol, polytetramethylene ether glycol, polyhexamethylene ether glycol, and copolymers of tetrahydrofuran and 3-alkyl tetrahydrofuran, and mixtures thereof.

10. A polyether ester as claimed in claim 9 wherein at least 85 weight % of the polymeric ether glycol used to form the polytrimethylene ether ester soft segment is the polytrimethylene ether glycol.

11. A polyether ester as claimed in claim 7 wherein the polytrimethylene ether glycol has number average molecular weight of at least about 1,000.

12. A polyether ester as claimed in claim 7 wherein the polytrimethylene ether glycol has number average molecular weight of about 1,000–about 5,000.

13. A polyether ester as claimed in claim 7 wherein the polytrimethylene ether glycol has number average molecular weight of less than about 5,000.

14. A polyether ester as claimed in claim 7 wherein the polytrimethylene ether glycol has a number average molecular weight in the range of about 1,500 to about 3,500.

15. A polyether ester as claimed in claim 7 wherein the tetramethylene ester hard segment is prepared from diol and the dicarboxylic acid, ester, acid chloride or acid anhydride, at least 75 mole % of the diol used to form the tetramethylene ester hard segment is 1,4-butanediol and up to 25 mole % of the diol is diol other than 1,4-butanediol with 2–15 carbon atoms.

16. A polyether ester as claimed in claim 15 wherein the diol other than 1,4-butanediol are selected from ethylene, isobutylene, trimethylene, pentamethylene, 2,2-dimethyltrimethylene, 2-methyltrimethylene, hexamethylene and decamethylene glycols, dihydroxy cyclohexane, cyclohexane dimethanol, hydroquinone bis(2-hydroxyethyl) ether, and mixtures thereof.

17. A polyether ester as claimed in claim 15 wherein the diol other than 1,4-butanediol contain 2–8 carbon atoms.

18. A polyether ester as claimed in claim 15 wherein the diol other than 1,4-butanediol are selected from the group consisting of ethylene glycol and 1,3-propanediol, and mixtures thereof.

19. A polyether ester as claimed in claim 15 wherein at least 85 mole % of the diol used to form the tetramethylene ester hard segment is 1,4-butanediol.

20. A polyether ester as claimed in claim 7 wherein the dicarboxylic acid, ester, acid chloride or acid anhydride is an aromatic dicarboxylic acid or diester.

21. A polyether ester as claimed in claim 7 wherein the dicarboxylic acid, ester, acid chloride or acid anhydride is selected from the group consisting of dimethyl terephthalate, bibenzoate, isophthlate, phthalate and naphthalate; terephthalic, bibenzoic, isophthalic, phthalic and naphthalic acid, and mixtures thereof.

22. A polyether ester as claimed in claim 7 wherein at least 50 mole % the dicarboxylic acid, ester, acid chloride or acid anhydride is selected from the group consisting of terephthalic acid and dimethyl terephthalate.

23. A polyether ester as claimed in claim 7 wherein the dicarboxylic acid, ester, acid chloride or acid anhydride is selected from the group consisting of terephthalic acid and dimethyl terephthalate.

24. A polyether ester as claimed in claim 7 having an inherent viscosity of about 1.4–about 2.4 dl/g, wherein the mole ratio of hard segment to soft segment is in the range of about 2.0–about 4.5; the polytrimethylene ether ester soft segment is prepared from polymeric ether glycol and the dicarboxylic acid, ester, acid chloride or acid anhydride; at least 40 weight % of the polymeric ether glycol used to form the polytrimethylene ether ester soft segment is the polytrimethylene ether glycol having a number average molecular weight of about 1,000–about 5,000, up to 60 weight % of the polymeric ether glycol used to form the polytrimethylene ether ester soft segment is polymeric ether glycol selected from the group consisting of polyethylene ether glycol, polypropylene ether glycol, polytetramethylene ether glycol, polyhexamethylene ether glycol, and copolymers of tetrahydrofuran and 3-alkyl tetrahydrofuran, and mixtures thereof; the tetramethylene ester hard segment is prepared from diol and the dicarboxylic acid, ester, acid chloride or acid anhydride; at least 75 mole % of the diol used to form the tetramethylene ester hard segment is 1,4-butanediol and up to 25 mole % of the diol are diol selected from ethylene, isobutylene, trimethylene, pentamethylene, 2,2-dimethyltrimethylene, 2-methyltrimethylene, hexamethylene and decamethylene glycols, dihydroxy cyclohexane, cyclohexane dimethanol, hydroquinone bis(2-hydroxyethyl) ether, and mixtures thereof; and the dicarboxylic acid, ester, acid chloride or acid anhydride is selected from the group consisting of dimethyl terephthalate, bibenzoate, isophthlate, phthalate and naphthalate, terephthalic, bibenzoic, isophthalic, phthalic and naphthalic acid, and mixtures thereof.

25. A polyether ester as claimed in claim 7 having an inherent viscosity of about 1.4–about 2.4 dl/g, wherein the mole ratio of hard segment to soft segment is in the range of about 2.5–about 4.0, at least 85 weight % of the polymeric ether glycol used to form the polytrimethylene ether ester soft segment is the polytrimethylene ether glycol; at least 85 mole % of the diol used to form the tetramethylene ester hard segment is the 1,4-butanediol; the polytrimethylene ether glycol has a number average molecular weight in the range of about 1,500 to about 3,500; at least 70 mole % the dicarboxylic acid, ester, acid chloride or acid anhydride is selected from the group consisting of terephthalic acid and dimethyl terephthalate.

26. A polyether ester as claimed in claim 1 prepared by providing and reacting polytrimethylene ether glycol and polytetramethylene ester.

27. A polyether ester comprising a soft segment represented by the structure:

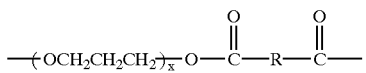

and a hard segment represented by the structure:

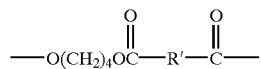

where x is about 17 to about 86 and R and R', which may be the same or different, are divalent radicals remaining after removal of carboxyl functionalities from dicarboxylic acid equivalent.

28. A polyether ester as claimed in claim 1 in the form of a fiber.

29. A polyether ester as claimed in claim 28 wherein the fiber is a monocomponent filament.

30. A polyether ester as claimed in claim 28 wherein the fiber is a staple fiber.

31. A polyether ester as claimed in claim 1 wherein the polyether ester in the form of a component of a multicomponent fiber.

32. A woven or knit fabric comprising fibers comprising the polyether ester of claim 1.

33. A nonwoven fabric comprising fibers comprising the polyether ester of claim 1.

34. A process of preparing a polyether ester as claimed in claim 1 by providing and reacting (a) polytrimethylene ether glycol, (b) 1,4-butanediol and (c) dicarboxylic acid, ester, acid chloride or acid anhydride.

35. A process of preparing a polyether ester as claimed in claim 1 by providing and reacting polytrimethylene ether glycol and tetramethylene ester.

36. A process of preparing a polyether ester as claimed in claim 1 prepared by providing and reacting polytrimethylene ether glycol and polytetramethylene ester.

37. A process of preparing a fiber by providing the polyether ester of claim 1 and spinning the polyether ester to form a fiber.

38. A process of preparing a fabric comprising (a) providing fibers, the fibers comprising fibers comprising the polyether ester of claim 1 and (b) forming a fabric from the fibers.

* * * * *